United States Patent
Kitazume et al.

(10) Patent No.: US 11,731,687 B2
(45) Date of Patent: Aug. 22, 2023

(54) TURNING CONTROL DEVICE AND TURNING DEVICE

(71) Applicant: NSK LTD., Tokyo (JP)

(72) Inventors: Tetsuya Kitazume, Maebashi (JP);
Shoya Maruyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/917,778

(22) PCT Filed: Feb. 14, 2022

(86) PCT No.: PCT/JP2022/005616
§ 371 (c)(1),
(2) Date: Oct. 7, 2022

(87) PCT Pub. No.: WO2022/201961
PCT Pub. Date: Sep. 29, 2022

(65) Prior Publication Data
US 2023/0120193 A1    Apr. 20, 2023

(30) Foreign Application Priority Data

Mar. 26, 2021   (JP) ................................ 2021-053306

(51) Int. Cl.
*B62D 5/04*    (2006.01)
*B62D 15/02*    (2006.01)

(52) U.S. Cl.
CPC ........ *B62D 5/0469* (2013.01); *B62D 15/0245* (2013.01)

(58) Field of Classification Search
CPC ........ B62D 5/0463; B62D 6/00; B62D 6/002; B62D 1/166; B62D 15/0245; B62D 6/08;
(Continued)

(56) References Cited

U.S. PATENT DOCUMENTS 8,977,437 B2 * 3/2015 Tamaizumi .......... B62D 5/0463
  280/771
11,577,777 B2 * 2/2023 Kataoka ............... B62D 5/0463
(Continued)

FOREIGN PATENT DOCUMENTS

EP    4116176 A1 * 1/2023
JP    2014-058240 A    4/2014
(Continued)

OTHER PUBLICATIONS

International Search Report for PCT/JP2022/005616 dated May 10, 2022 (PCT/ISA/210).
(Continued)

*Primary Examiner* — Redhwan K Mawari
(74) *Attorney, Agent, or Firm* — Sughrue Mion, PLLC

(57) ABSTRACT

A terminal position learning unit includes a first storage unit configured to store a steered position positioned farthest from a neutral position of a turning mechanism within a range of a steered position detected by a position detection unit when rotational force applied to the turning mechanism is less than or equal to a first predetermined value, a second storage unit configured to store a steered position positioned farthest from the neutral position within a range of a position to which a steered position detected by the position detection unit is shifted in a direction toward the neutral position by a second predetermined value, and a third storage unit configured to store, as a terminal position stored by the terminal position learning unit, one of the steered positions stored in the first storage unit and the second storage unit positioned farther from the neutral position than the other.

11 Claims, 7 Drawing Sheets

(58) Field of Classification Search
CPC . B62D 6/02; B62D 6/10; B62D 7/159; G05B 13/04; G05B 13/041
See application file for complete search history.

(56) References Cited

U.S. PATENT DOCUMENTS

| | | | |
|---|---|---|---|
| 2014/0081524 A1* | 3/2014 | Tamaizumi | B62D 5/0463 701/42 |
| 2017/0297613 A1* | 10/2017 | Sakaguchi | G05B 13/041 |
| 2017/0327144 A1* | 11/2017 | Sakaguchi | B62D 5/0469 |
| 2017/0327145 A1 | 11/2017 | Sakaguchi et al. | |
| 2017/0334481 A1* | 11/2017 | Sakaguchi | B62D 5/0469 |
| 2018/0079447 A1* | 3/2018 | Yamashita | B62D 5/0469 |
| 2018/0167004 A1* | 6/2018 | Suzuki | H02P 6/28 |
| 2018/0346018 A1* | 12/2018 | Kataoka | B62D 5/0463 |

FOREIGN PATENT DOCUMENTS

| | | |
|---|---|---|
| JP | 2019-104476 A | 6/2019 |
| JP | 2019-127185 A | 8/2019 |
| WO | 2016/104568 A1 | 6/2016 |
| WO | WO-2022201961 A1 * | 9/2022 |

OTHER PUBLICATIONS

Written Opinion of the International Searching Authority for PCT/JP2022/005616 dated May 10, 2022 (PCT/ISA/237).

* cited by examiner

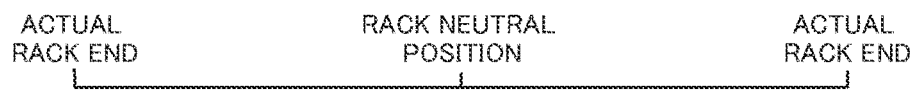
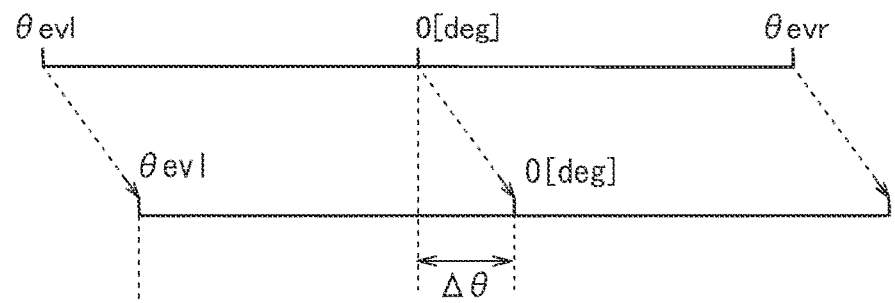
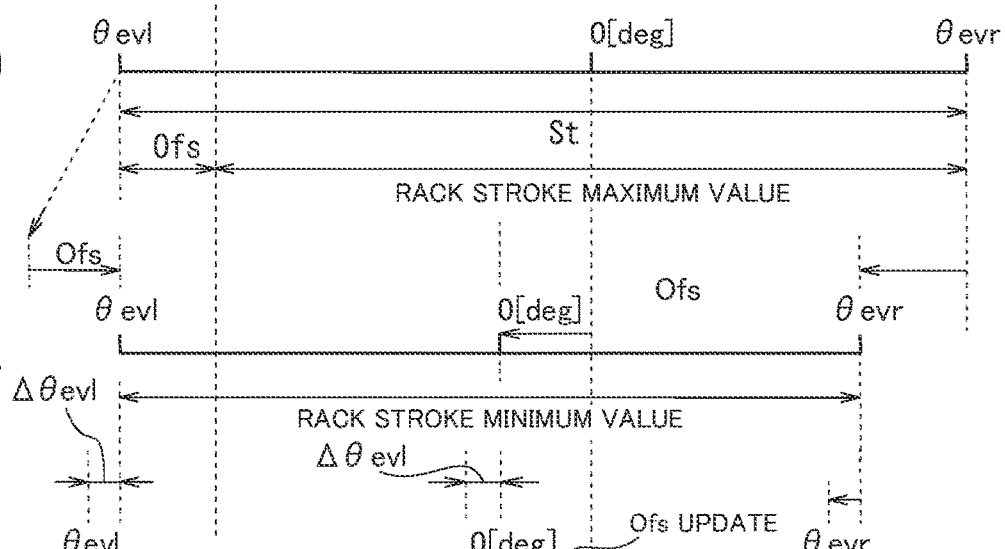
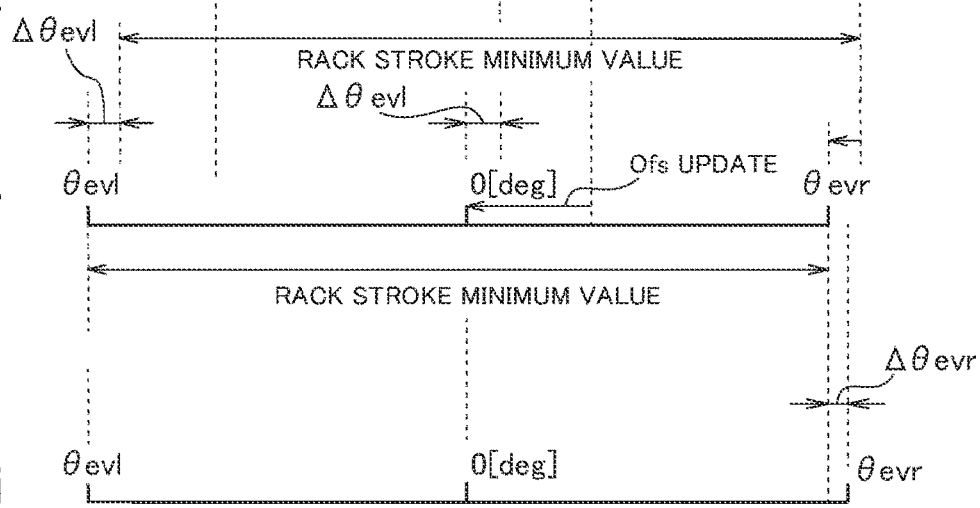

TURNING CONTROL DEVICE AND TURNING DEVICE

CROSS REFERENCE TO RELATED APPLICATIONS

This application is a National Stage of International Application No. PCT/JP2022/005616 filed Feb. 14, 2022, claiming priority based on Japanese Patent Application No. 2021-053306 filed Mar. 26, 2021.

TECHNICAL FIELD

The present invention relates to a turning control device and a turning device.

BACKGROUND ART

In a turning mechanism of a vehicle, when a turning angle increases and reaches a maximum mechanical turning angle, the rack shaft of the turning mechanism reaches a stroke end and it becomes impossible to increase the turning angle any further. The rack shaft being brought to a state of having reached a stroke end as described above is referred to as "end-abutting". In addition, a stroke end of the rack shaft is sometimes referred to as "rack end".

When end-abutting occurs at a high turning velocity, there is a possibility that large impact and hit sound (abnormal noise) are generated and the driver feels uncomfortable. In PTL 1, a technology for mitigating impact at the time of end-abutting by learning a maximum value of the absolute value of a steering angle as a rack end position and increasing steering reaction force before the steering angle reaches the rack end position is described.

CITATION LIST

Patent Literature

PTL 1: JP 2019-104476 A

SUMMARY OF INVENTION

Technical Problem

However, between a sensor to detect a steering angle and a rack in a turning mechanism, there exist elastic bodies, such as a gear, and looseness, such as backlash. Thus, there occurs error between a virtual rack end position (hereinafter, sometimes referred to as "virtual rack end position") that is learned based on the steering angle detected by the sensor and an actual rack end position (hereinafter, sometimes referred to as "actual rack end position").

When error occurs to the virtual rack end position, there is a possibility that, even when steering reaction force is increased before the steering angle reaches the virtual rack end position, desired output required for mitigation of impact or abnormal noise at the time of end-abutting cannot be acquired and more-than-expected impact and abnormal noise are caused to occur.

The present invention has been made in consideration of the above-described problem, and an object of the present invention is to reduce error between virtual rack end positions and actual rack end positions.

Solution to Problem

In order to achieve the above-described object, according to an aspect of the present invention, there is provided a turning control device including: a position detection unit configured to detect a steered position of a turning mechanism of a vehicle; and a terminal position learning unit configured to learn a terminal position of the turning mechanism, based on the steered position detected by the position detection unit, wherein the terminal position learning unit includes: a first storage unit configured to store a steered position positioned farthest from a neutral position of the turning mechanism within a range of the steered position detected by the position detection unit when rotational force applied to the turning mechanism is less than or equal to a first predetermined value; a second storage unit configured to store a steered position positioned farthest from the neutral position within a range of a position to which the steered position detected by the position detection unit is shifted in a direction toward the neutral position of the turning mechanism by a second predetermined value; and a third storage unit configured to store one of steered positions stored in the first storage unit and the second storage unit, the one being positioned farther from the neutral position than the other, as the terminal position stored by the terminal position learning unit.

According to another aspect of the present invention, there is provided a turning device including: the turning control device described above; and an actuator configured to, drive-controlled by the turning control device, turn steered wheels of the vehicle.

Advantageous Effects of Invention

According to the present invention, it is possible to reduce error between virtual rack end positions and actual rack end positions.

BRIEF DESCRIPTION OF DRAWINGS

FIGS. 8A, 8B, 8C, 8D, 8E, 8F, and 8G are a conceptual diagram of actual rack end positions, a conceptual diagram of virtual rack end positions in the case where there is no offset error, a conceptual diagram of the virtual rack end position in the case where there is an offset error, a conceptual diagram of a state in which, after offset error has occurred, a left virtual rack end position is learned, a conceptual diagram of correction of a steering angle detected by a steering angle sensor and resetting of a learned value of a right virtual rack end position, a conceptual diagram of a state in which the left virtual rack end position is further learned, and a conceptual diagram of a state in which the right virtual rack end position is learned, respectively.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
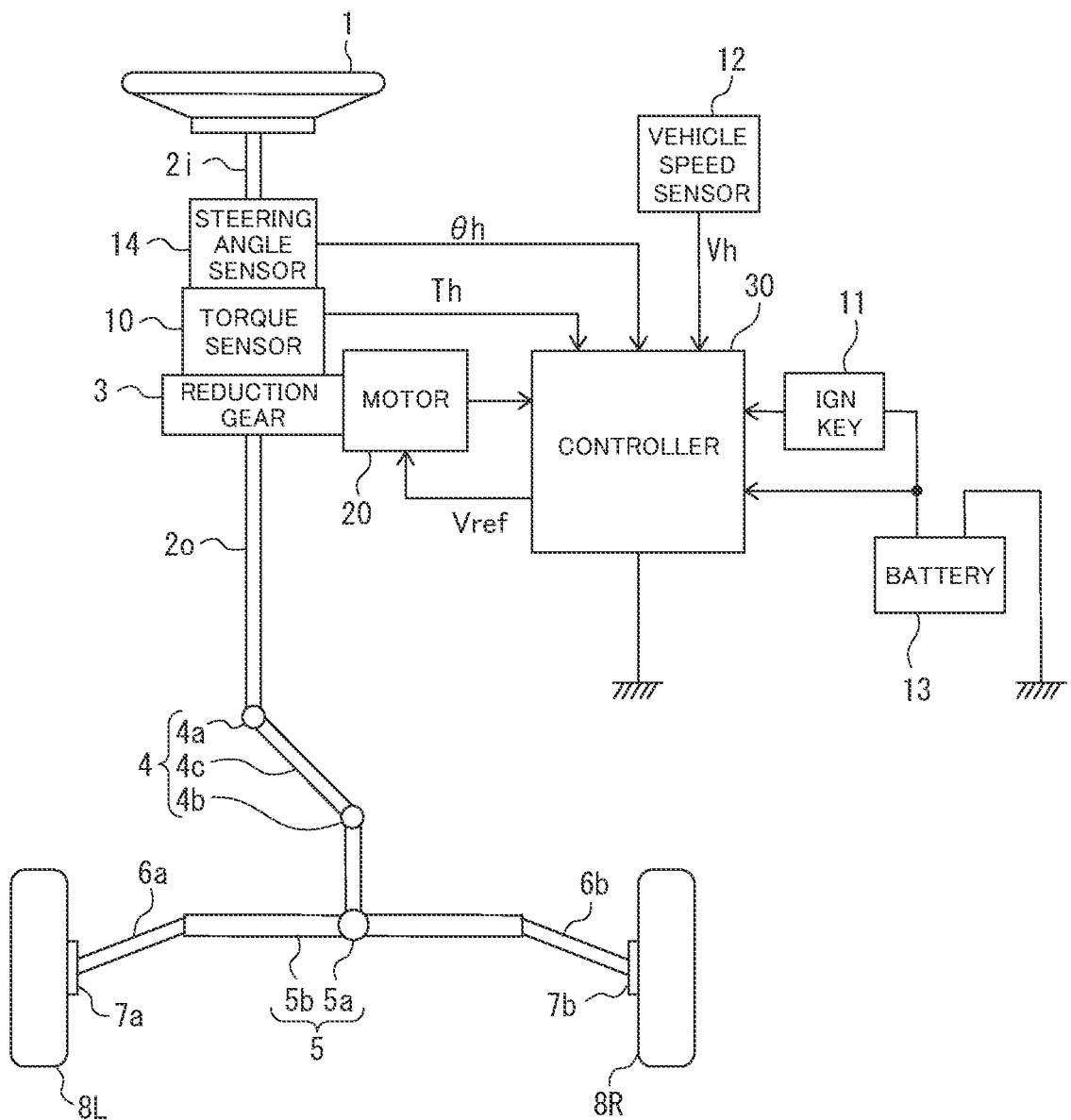
FIG. 1 is a configuration diagram illustrative of an outline of an example of an electric power steering device of an embodiment.

FIG. 1 is a configuration diagram illustrative of an outline of an example of an electric power steering device of an embodiment. Column shafts (steering shafts) 2i and 2o of a steering wheel (steering handlebar) 1 is connected to steered wheels 8L and 8R via a reduction gear (worm gear) 3, which constitutes a speed reduction mechanism, an intermediate shaft 4, a pinion rack mechanism 5, and tie rods 6a and 6b and further via hub units 7a and 7b.

The column input shaft 2i and the column output shaft 2o are connected by a torsion bar (not illustrated) that is twisted due to a difference in rotation angles between the column input shaft 2i and the column output shaft 2o.

The intermediate shaft 4 includes a shaft member 4c and universal joints 4a and 4b that are attached to both ends of the shaft member. The universal joint 4a is coupled to the column output shaft 2o, and the universal joint 4b is coupled to the pinion rack mechanism 5.

The pinion rack mechanism 5 includes a pinion 5a that is coupled to a pinion shaft, to which steering force is transmitted from the universal joint 4b, and a rack 5b that meshes with the pinion 5a, and converts rotational motion transmitted to the pinion 5a to linear motion in the vehicle width direction by means of the rack 5b.

To the steering shaft 2 (column shafts 2i and 2o), a torque sensor 10 configured to detect steering torque Th is disposed. To the steering shaft 2 (column shafts 2i and 2o), a steering angle sensor 14 configured to detect a steering angle θh of the steering wheel 1 is also disposed.

A motor 20 configured to assist steering force of the steering wheel 1 is also connected to the column output shaft 2o via the reduction gear 3. To a controller 30 configured to control the electric power steering (EPS) device, power is supplied from a battery 13 and an ignition key signal is also input via an ignition (IGN) key 11.

Note that a means for providing steering assist force is not limited to a motor and a variety of types of actuators can be used.

The controller 30 performs calculation of a current command value of an assist control command, based on steering torque Th detected by the torque sensor 10, vehicle speed Vh detected by a vehicle speed sensor 12, and a steering angle θh detected by the steering angle sensor 14 and controls current to be supplied to the motor 20 by a voltage control command value Vref obtained by performing compensation and the like on the calculated current command value.

Note that the steering angle sensor 14 is not an essential component and the steering angle θh may be calculated by adding a torsion angle of a torsion bar in the torque sensor 10 to a rotation angle obtained from a rotation angle sensor configured to detect a rotation angle of the rotation shaft of the motor 20.

The controller 30 may include, for example, a computer including a processor and peripheral components, such as a storage device. The processor may be, for example, a central processing unit (CPU) or a micro-processing unit (MPU).

The storage device may include any one of a semiconductor storage device, a magnetic storage device, and an optical storage device. The storage device may include registers, a cache memory, or a memory, such as a read only memory (ROM) and a random access memory (RAM) that is used as a main storage device.

Functions of the controller 30, which will be described below, are achieved by, for example, the processor of the controller 30 executing computer programs stored in the storage device.

Note that the controller 30 may be formed by use of dedicated hardware for performing information processing, which will be described below.

For example, the controller 30 may include functional logic circuits that are set in a general-purpose semiconductor integrated circuit. For example, the controller 30 may have a programmable logic device (PLD), such as a field-programmable gate array (FPGA).

Figure 2:
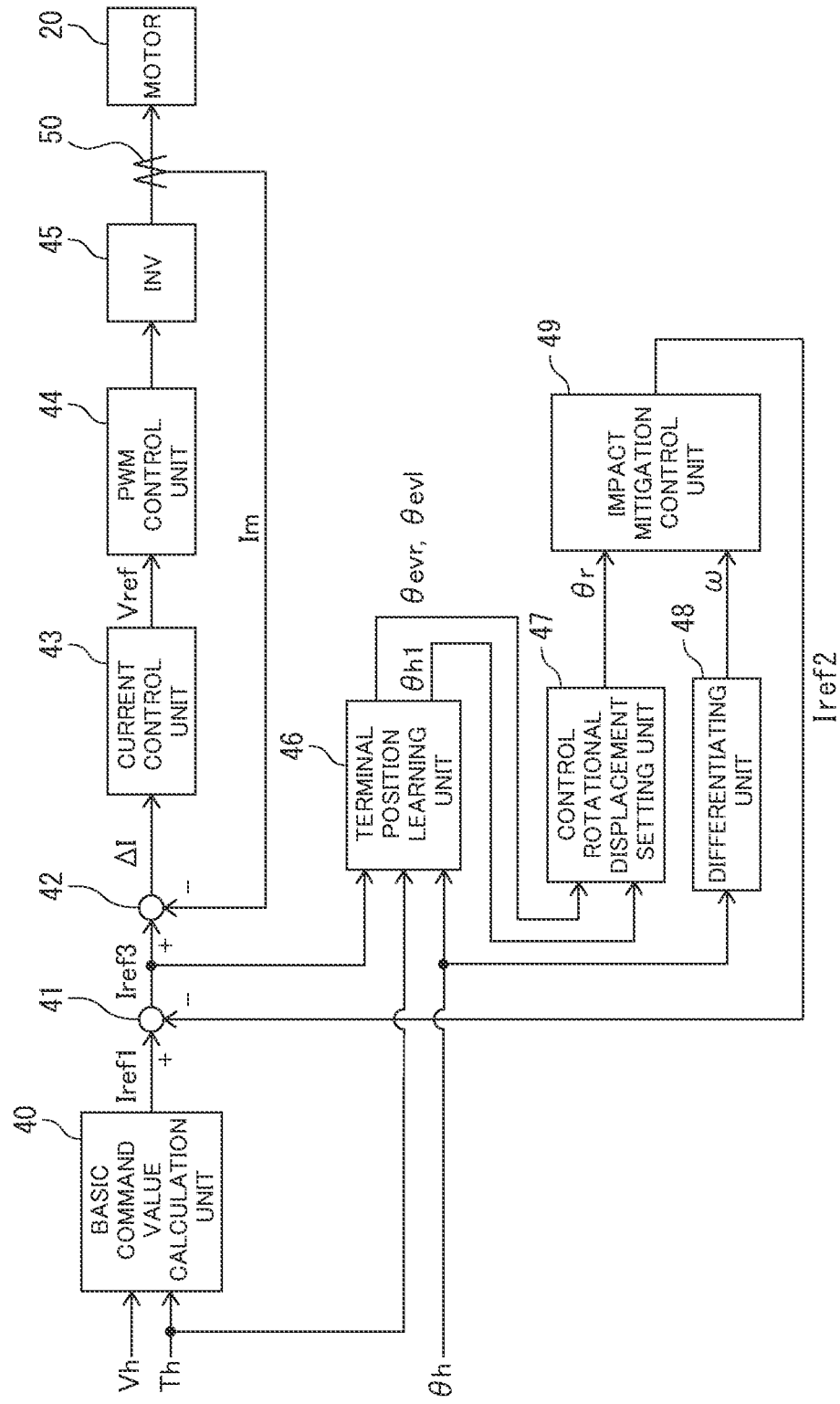
FIG. 2 is a block diagram illustrative of an example of a functional configuration of a controller illustrated in FIG. 1.

FIG. 2 is a block diagram illustrative of an example of a functional configuration of the controller 30 of the embodiment. The controller 30 includes a basic command value calculation unit 40, subtracters 41 and 42, a current control unit 43, a pulse width modulation (PWM) control unit 44, an inverter (INV) 45, a terminal position learning unit 46, a control rotational displacement setting unit 47, a differentiating unit 48, and an impact mitigation control unit 49.

The basic command value calculation unit 40 calculates a basic current command value Iref1, which is a control target value of driving current of the motor 20, based on the steering torque Th from the torque sensor 10 and the vehicle speed Vh from the vehicle speed sensor 12.

The subtracter 41 corrects the basic current command value Iref1 by subtracting impact mitigation control output Iref2 output from the impact mitigation control unit 49 from the basic current command value Iref1 and outputs the basic current command value Iref1 after correction as a current command value Iref3.

The impact mitigation control unit 49 mitigates impact and hit sound (abnormal noise) due to end-abutting by suppressing increase in the steering angle θh when the steering angle θh comes close to a rack end position. Control performed by the impact mitigation control unit 49 to mitigate impact and abnormal noise due to end-abutting is sometimes referred to as "impact mitigation control".

The impact mitigation control unit 49 outputs a current command value to suppress increase in the steering angle θh in order to mitigate impact and hit sound due to end-abutting, as the impact mitigation control output Iref2. For example, the impact mitigation control unit 49 may output a current command value to generate steering reaction force. Details of the impact mitigation control unit 49 will be described later.

The current command value Iref3 that the subtracter 41 calculated is input to the subtracter 42, and deviation (Iref3−Im) between the current command value Iref3 and a fed-back motor current value Im is calculated. The deviation (Iref3−Im) is controlled by the current control unit 43 configured to perform PI control or the like, a current-controlled voltage control value Vref is input to the PWM control unit 44 and a duty ratio is calculated therein, and the motor 20 is PWM-driven by a PWM signal via the inverter 45. The motor current value Im of the motor 20 is detected by a current detector 50, and input to the subtracter 42 and thereby fed back.

The subtracter 41 is an example of a "command value correction unit" described in the claims, and the subtracter 42, the current control unit 43, the PWM control unit 44, and the inverter 45 are an example of a "driving unit" described in the claims.

The terminal position learning unit 46 learns, based on the steering angle θh detected by the steering angle sensor 14, virtual rack end positions θevr and θevl, which are terminal positions of a turning mechanism. θevr denotes a virtual rack end position at the time of rightward steering and has a positive value. θevl denotes a virtual rack end position at the time of leftward steering and has a negative value.

Further, error (hereinafter, sometimes referred to as "offset error") sometimes occurs between a central position between right and left actual rack end positions (hereinafter, sometimes referred to as "rack neutral position") and a neutral position of the steering angle θh of the column shaft (hereinafter, sometimes referred to as "steering angle neutral position"), which is detected by the steering angle sensor 14.

Such offset error occurs due to reasons such as incorrect assembly of the intermediate shaft 4. The terminal position learning unit 46 estimates offset error Ofs and outputs a corrected steering angle θh1, to which the steering angle θh detected by the steering angle sensor 14 is corrected by subtracting the offset error Ofs from the steering angle θh. Details of the terminal position learning unit 46 will be described later.

The control rotational displacement setting unit 47 sets control rotational displacement θr, which indicates how close the corrected steering angle θh1 is to one of the virtual rack end positions θevr and θevl when the corrected steering angle θh1 comes close to a rack end position and is within a range where the impact mitigation control is executed (hereinafter, sometimes referred to as "impact mitigation control execution range").

Figure 3:
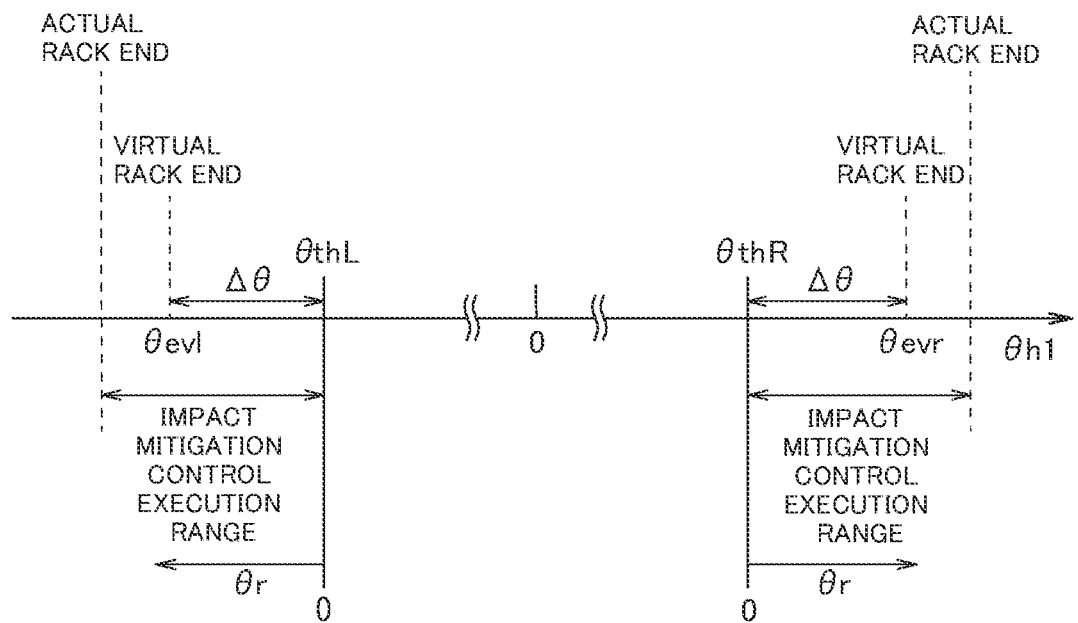
FIG. 3 is an explanatory diagram of an example of a steering angle range where impact mitigation control is performed.

FIG. 3 is now referred to. In the case of the rightward steering (that is, in the case where the corrected steering angle θh1 is a positive value), a range where the corrected steering angle θh1 is greater than a threshold value θthR is the impact mitigation control execution range, and, in the case of the leftward steering (that is, in the case where the corrected steering angle θh1 is a negative value), a range where the corrected steering angle θh1 is less than a threshold value θthL is the impact mitigation control execution range.

The threshold values θthR and θthL are set based on the virtual rack end positions θevr and θevl, respectively. For example, the threshold value θthR for the rightward steering may be a value obtained by subtracting a positive predetermined value Δθ from the virtual rack end position θevr (θevr−Δθ), and the threshold value θthL for the leftward steering may be a value obtained by adding the predetermined value Δθ to the virtual rack end position θevl (θevl+Δθ).

The control rotational displacement θr is, for example, set to zero ("0") outside the impact mitigation control execution range (that is, θthL≤θh1≤θthR), and, within the impact mitigation control execution range for the rightward steering, as a difference (θh1−θthR) obtained by subtracting the threshold value θthR from the corrected steering angle θh1 increases, a larger control rotational displacement θr is set. In contrast, within the impact mitigation control execution range for the leftward steering, as a difference (θh1−θthL) obtained by subtracting the threshold value θthL from the corrected steering angle θh1 decreases (that is, as the absolute value |θh1−θthL| increases), a smaller negative control rotational displacement θr (that is, a larger absolute value |θr|) may be set.

In other words, in a range where the corrected steering angle θh1 is greater than the threshold value θthR, the positive control rotational displacement θr increases according to increase in the corrected steering angle θh1, and, in a range where the corrected steering angle θh1 is less than the threshold value θthL, the negative control rotational displacement θr decreases according to decrease in the corrected steering angle θh1.

For example, the control rotational displacement setting unit 47 may set a difference θh1−θthR as the control rotational displacement θr when the corrected steering angle θh1 is greater than the threshold value θthR, and may set a difference θh1−θthL as the control rotational displacement θr when the corrected steering angle θh1 is less than the threshold value θthL.

FIG. 2 is now referred to. The differentiating unit 48 differentiates the steering angle θh detected by the steering angle sensor 14 and thereby calculates steering angular velocity ω.

The impact mitigation control unit 49 sets the impact mitigation control output Iref2, based on the control rotational displacement θr and the steering angular velocity ω.

Figure 4:
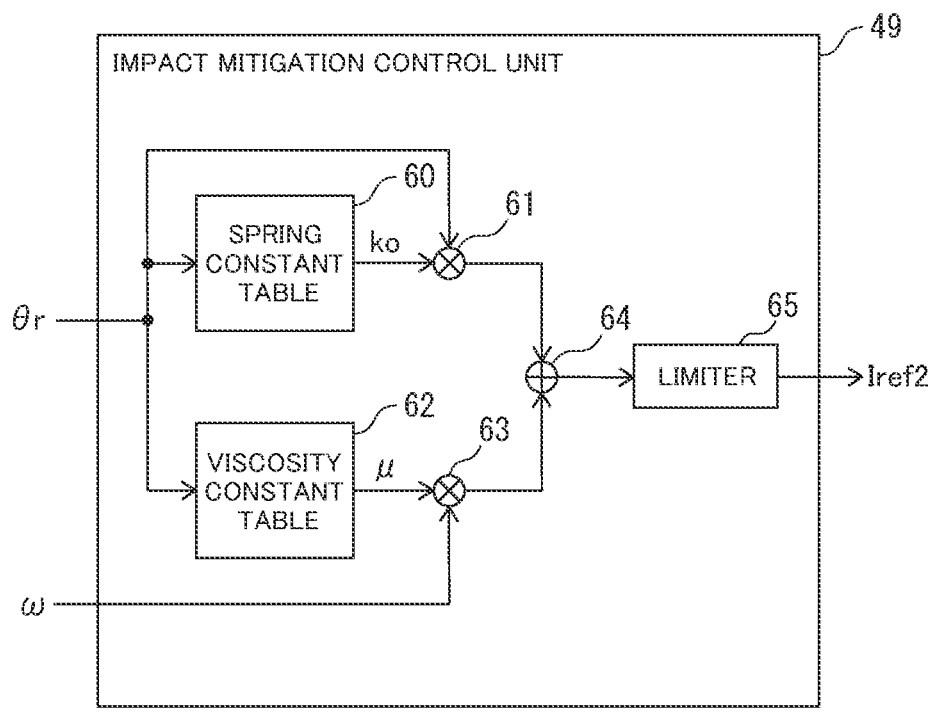
FIG. 4 is a block diagram illustrative of an example of a functional configuration of an impact mitigation control unit.

FIG. 4 is a block diagram illustrative of an example of a functional configuration of the impact mitigation control unit 49. The impact mitigation control unit 49 includes a spring constant table 60, multipliers 61 and 63, a viscosity constant table 62, an adder 64, and a limiter 65.

Figure 5A:
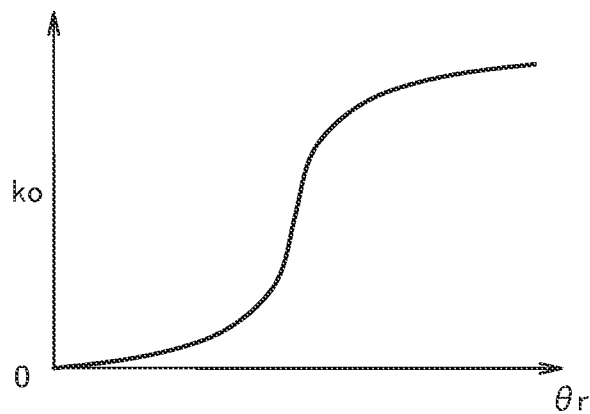
FIGS. 5A and 5B area characteristic diagram illustrative of a characteristic example of a spring constant table and a characteristic diagram illustrative of a characteristic example of a viscosity constant table, respectively.

The spring constant table 60 is a data table calculating a spring constant k0 of a steering system. The spring constant k0 has a characteristic of comparatively steeply increasing (nonlinearly increasing) at a middle portion of a change region as the control rotational displacement θr increases, as illustrated in FIG. 5A. Note that a characteristic in the case where the control rotational displacement θr is a negative value is a characteristic that is line symmetric to the characteristic in FIG. 5A with the spring-constant-k0 axis (ordinate axis) as the symmetry axis.

Figure 5B:
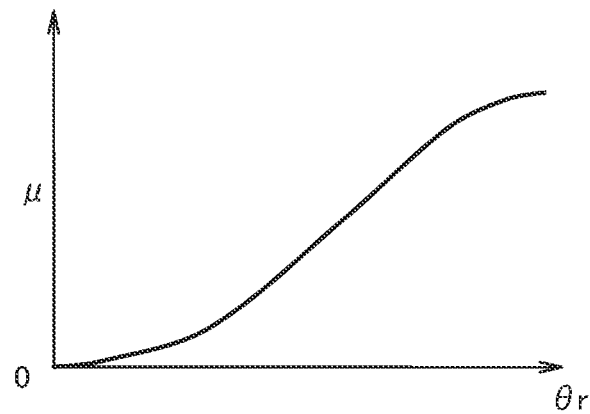

The viscosity constant table 62 is a data table calculating a viscosity constant μ of the steering system. The viscosity constant μ has a characteristic of comparatively gently and gradually increasing (nonlinearly increasing) over the entire range as the control rotational displacement θr increases, as illustrated in FIG. 5B. Note that a characteristic in the case where the control rotational displacement θr is a negative value is a characteristic that is line symmetric to the characteristic in FIG. 5B with the viscosity-constant-μ axis (ordinate axis) as the symmetry axis.

The spring constant k0 from the spring constant table 60 is multiplied by the control rotational displacement θr by the multiplier 61, and a multiplication result (k0×θr) is input to the adder 64. In addition, the viscosity constant μ from the viscosity constant table 62 is multiplied by the steering angular velocity ω by the multiplier 63, and a multiplication result (μ×ω) is input to the adder 64. An addition result (=k0×θr+μ×ω) by the adder 64 is input to the limiter 65, and the impact mitigation control output Iref2 the maximum value of which is limited is set.

Note that the configuration of the impact mitigation control unit 49 in FIG. 4 is only an exemplification and the present invention is not limited to the above-described configuration. The impact mitigation control unit 49 is only required to have a configuration capable of outputting the impact mitigation control output Iref2 that suppresses increase in the steering angle θh when the corrected steering angle θh1 comes close to a rack end position.

Next, details of the terminal position learning unit 46 will be described. The terminal position learning unit 46 calculates, within the range of the steering angle θh detected by the steering angle sensor 14 when rotational force applied to the turning mechanism is less than or equal to a first predetermined value, a steering angle that is positioned farthest from the steering angle neutral position (in the case of the positive steering angle θh, the maximum steering angle, and, in the case of the negative steering angle θh, the minimum steering angle) as a first candidate θm1 of one of the virtual rack ends.

For example, the terminal position learning unit 46 may calculate a first candidate of one of the virtual rack ends when column output shaft torque Tc applied to the column output shaft 2o is less than or equal to a predetermined value T1.

The terminal position learning unit 46 may calculate, within the range of the steering angle θh detected by the steering angle sensor 14 when the rotational force applied to the turning mechanism is less than or equal to the first predetermined value and operational force acting on a steering operation unit is less than or equal to a third predetermined value, a steering angle that is positioned farthest from the steering angle neutral position as the first candidate θm1 of one of the virtual rack ends.

For example, the terminal position learning unit 46 may calculate the first candidate θm1 when the column output shaft torque Tc is less than or equal to the predetermined value T1 and the steering torque Th is less than or equal to a predetermined value T2.

In addition, the terminal position learning unit 46 calculates, within the range of an angle obtained by shifting the steering angle θh detected by the steering angle sensor 14 in a direction toward the steering angle neutral position by a second predetermined value, a steering angle that is positioned farthest from the steering angle neutral position (that is, in the case of the positive steering angle θh, an angle obtained by subtracting the second predetermined value from the maximum steering angle, and, in the case of the negative steering angle θh, an angle obtained by adding the second predetermined value to the minimum steering angle) as a second candidate θm2 of one of the virtual rack ends.

As the second predetermined value, for example, a maximum value that can be considered as error may be set.

The terminal position learning unit 46 selects, from among the first candidate θm1 and the second candidate θm2, a steering angle that is positioned farthest from the steering angle neutral position as one of the virtual rack end positions θevr and θevl.

This configuration can reduce influence of torsion or the like occurring due to torque and reduce error between the virtual rack end positions θevr and θevl and actual rack end positions.

Figure 6:
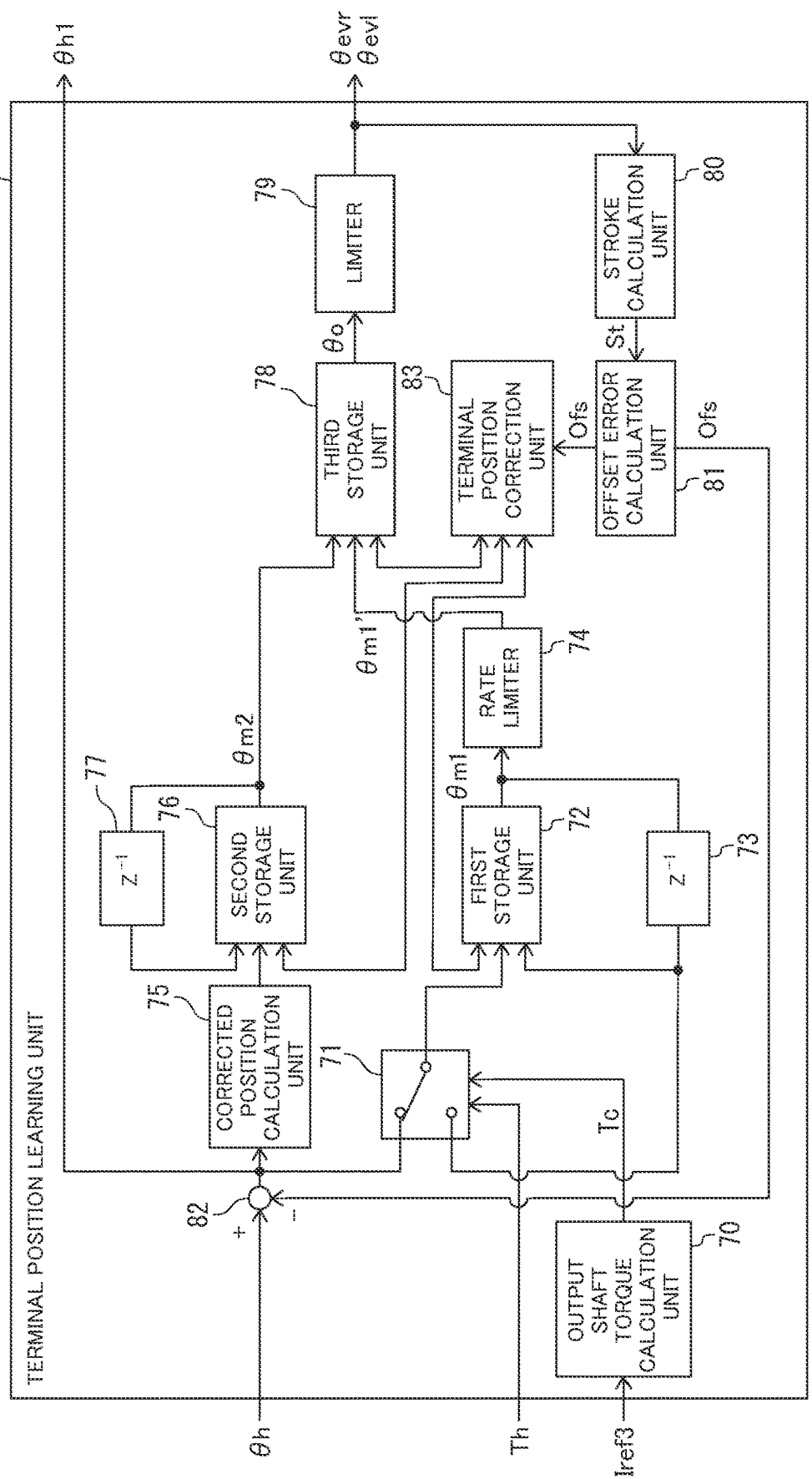
FIG. 6 is a block diagram illustrative of an example of a functional configuration of a terminal position learning unit.

FIG. 6 is a block diagram illustrative of an example of a functional configuration of the terminal position learning unit 46. The terminal position learning unit 46 includes an output shaft torque calculation unit 70, a selection unit 71, a first storage unit 72, delay units 73 and 77, a rate limiter 74, a corrected position calculation unit 75, a second storage unit 76, a third storage unit 78, a limiter 79, a stroke calculation unit 80, an offset error calculation unit 81, a subtracter 82, and a terminal position correction unit 83.

The output shaft torque calculation unit 70 calculates the column output shaft torque Tc applied to the column output shaft 2o.

For example, the output shaft torque calculation unit 70 may calculate, as the column output shaft torque Tc, motor torque estimated by multiplying the current command value Iref3 for the motor 20 or the motor current value Im detected by the current detector 50 by a motor torque constant and a reduction ratio of the reduction gear 3.

For example, the output shaft torque calculation unit 70 may calculate, as the column output shaft torque Tc, the sum of motor torque estimated by multiplying the current command value Iref3 for the motor 20 by the motor torque constant and the reduction ratio of the reduction gear 3 and the steering torque Th detected by the torque sensor 10.

For example, the output shaft torque calculation unit 70 may also calculate, as the column output shaft torque Tc, the sum of motor torque estimated by multiplying the motor current value Im detected by the current detector 50 by the motor torque constant and the reduction ratio of the reduction gear 3 and the steering torque Th detected by the torque sensor 10.

In addition, the output shaft torque calculation unit 70 may calculate motor angular acceleration by second-order differentiating a detected value by the angle sensor of the motor 20, estimate inertia torque by multiplying the motor angular acceleration by a moment of inertia, and add the inertia torque to the column output shaft torque Tc calculated as described above.

The column output shaft torque Tc is an example of "rotational force applied to the turning mechanism". The steering torque Th is an example of "operational force acting on a steering operation unit of the vehicle".

The subtracter 82 calculates the corrected steering angle θh1 by subtracting the offset error Ofs calculated by the offset error calculation unit 81 from the steering angle θh detected by the steering angle sensor 14. The calculation of the offset error Ofs by the offset error calculation unit 81 will be described later.

The selection unit 71 selects one of the corrected steering angle θh1 and output of the delay unit 73 depending on values of the column output shaft torque Tc and the steering torque Th and outputs the selected one to the first storage unit 72. The delay unit 73 delays the first candidate θm1 of one of the virtual rack ends that is stored in and output from the first storage unit 72 and outputs the delayed first candidate θm1.

For example, the selection unit 71 may, in the case where the column output shaft torque Tc is less than or equal to the predetermined value T1 and the steering torque Th is less than or equal to the predetermined value T2, select the corrected steering angle θh1 calculated from the detected steering angle θh and output the selected corrected steering angle θh1 to the first storage unit 72 and, in the other case, output the output of the delay unit 73 to the first storage unit 72.

The first storage unit 72 stores one of the output of the delay unit 73 and the corrected steering angle θh1 that is positioned farther from the steering angle neutral position than the other as the first candidate θm1 of one of the virtual rack ends.

Because of this configuration, when the corrected steering angle θh1 that is calculated when the column output shaft torque Tc is less than or equal to the predetermined value T1 and the steering torque Th is less than or equal to the predetermined value T2 is positioned farther from the steering angle neutral position than the first candidate θm1 having been stored in the first storage unit 72 up to that time, the first candidate θm1 stored in the first storage unit 72 is updated by the corrected steering angle θh1.

Note that the selection unit 71 may, in the case where the column output shaft torque Tc is less than or equal to the predetermined value T1, select the corrected steering angle θh1 and output the selected corrected steering angle θh1 to the first storage unit 72 and, in the other case, output the output of the delay unit 73 to the first storage unit 72.

The rate limiter 74 accepts, as input, the first candidate θm1 output from the first storage unit 72 and a steering angle θo output from the third storage unit. The rate limiter 74 limits a change rate of the first candidate θm1 with respect to the delayed steering angle θo and outputs a first candidate θm1' generated by limiting the change rate of the first candidate θm1 to the third storage unit 78.

The corrected position calculation unit 75 calculates an angle obtained by shifting the corrected steering angle θh1 in the direction toward the steering angle neutral position by the second predetermined value. That is, when the corrected steering angle θh1 is positive, the corrected position calculation unit 75 outputs an angle obtained by subtracting the second predetermined value from the corrected steering angle θh1. When the corrected steering angle θh1 is negative, the corrected position calculation unit 75 outputs an angle obtained by adding the second predetermined value to the corrected steering angle θh1.

The second storage unit 76 stores one of the output of the corrected position calculation unit 75 and the output of the delay unit 77 that is positioned farther from the steering angle neutral position than the other as the second candidate θm2 of one of the virtual rack ends. The delay unit 77 delays the second candidate θm2 of one of the virtual rack ends that is stored in and output from the second storage unit 76 and outputs the delayed second candidate θm2.

Because of this configuration, when the output of the corrected position calculation unit 75 (that is, an angle obtained by shifting the corrected steering angle θh1 in the direction toward the steering angle neutral position by the second predetermined value) is positioned farther from the steering angle neutral position than the second candidate θm2 having been stored in the second storage unit 76 up to that time, the second candidate θm2 stored in the second storage unit 76 is updated by the output of the corrected position calculation unit 75.

The third storage unit 78 stores one of the first candidate θm1' the change rate of which is limited by the rate limiter 74 and the second candidate θm2 that is positioned farther from the steering angle neutral position than the other as the steering angle θo and outputs the steering angle θo.

The limiter 79 limits the magnitude of the steering angle θo, which is output from the third storage unit 78, and outputs the limited steering angle θo as one of the virtual rack end positions θevr and θevl.

Figure 7A:
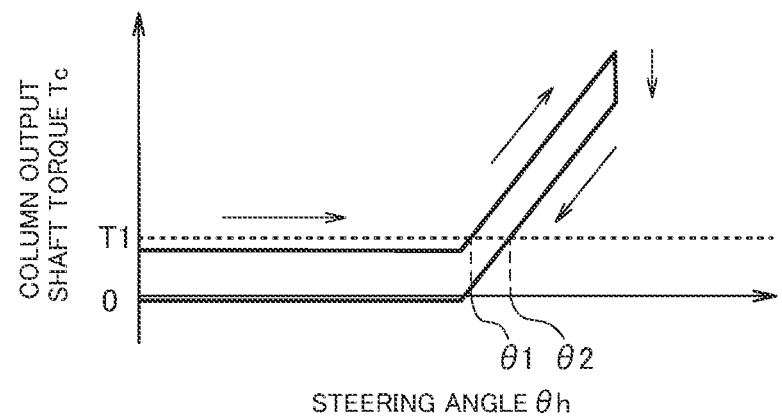
FIGS. 7A and 7B are an explanatory diagram of an example of change in column output shaft torque associated with change in a steering angle and an explanatory diagram of an example of a learned value of a terminal position when the column output shaft torque in FIG. 7A is generated, respectively.
Figure 7B:
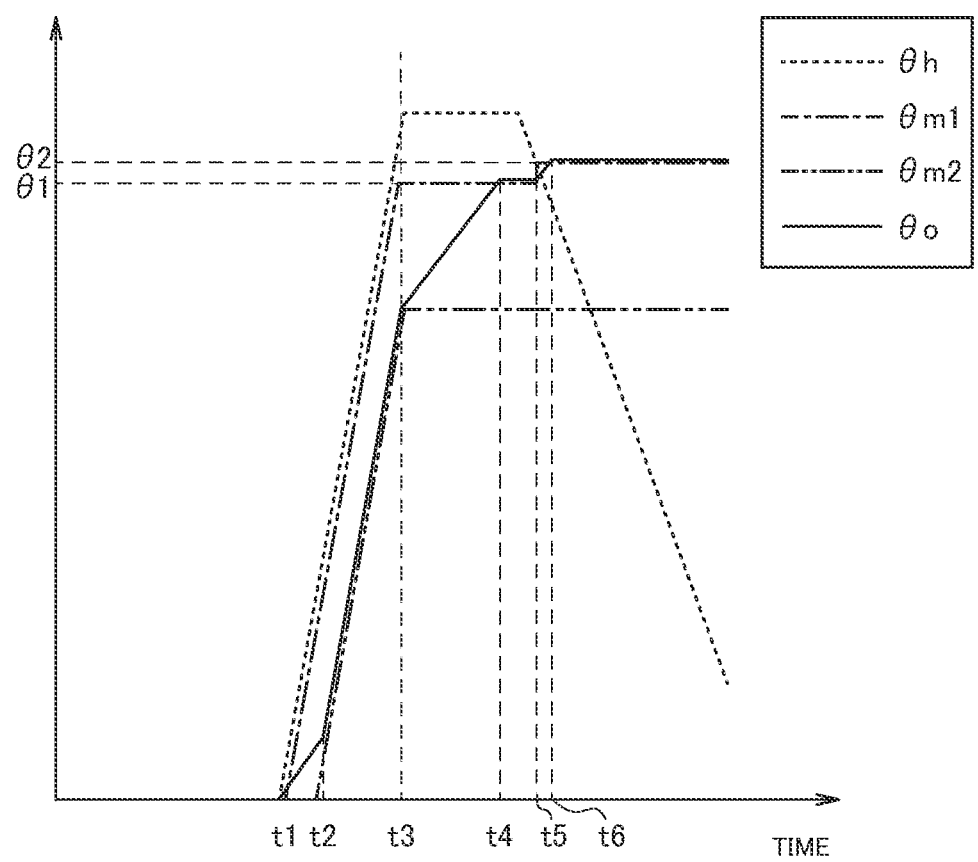

With reference to FIGS. 7A and 7B, a learning example of a virtual rack end according to the present embodiment will be described. For simplification of description, a case is described where it is assumed that the offset error Ofs is 0 (that is, "steering angle θh=corrected steering angle θh1" holds), and, when the steering angle θh that is detected when the column output shaft torque Tc is less than or equal to the predetermined value T1 is positioned farther from the steering angle neutral position than the first candidate θm1 having been stored in the first storage unit 72 up to that time, the first candidate θm1 is updated.

FIG. 7A is an explanatory diagram of an example of change in the column output shaft torque Tc associated with change in the steering angle θh. Arrows in the drawing indicate steering directions.

At the time of additional turning of the steering wheel, the column output shaft torque Tc exceeds the predetermined value T1 when the steering angle θh exceeds θ1, and, at the time of subsequent reverse turning of the steering wheel, the column output shaft torque Tc becomes less than the predetermined value T1 when the steering angle θh becomes less than θ2 (θ2>θ1).

FIG. 7B is an explanatory diagram of an example of a learned value of a virtual rack end in the rightward steering when the column output shaft torque Tc in FIG. 7A is generated. The dashed line, the dashed-dotted line, the dashed-two-dotted line, and the solid line indicate the steering angle θh, the first candidate θm1, the second candidate θm2, and the output θo from the third storage unit 78 (one of the virtual rack end positions θevr and θevl before being limited by the limiter 79), respectively. Note that the dashed-dotted line and the dashed-two-dotted line are illustrated at slightly shifted positions lest the dashed-dotted line and the dashed-two-dotted line overlap other lines.

When, at time t1, the steering angle θh increases and the additional turning of the steering wheel is started, while the column output shaft torque Tc is less than or equal to the predetermined value T1 (that is, while the steering angle θh is less than or equal to θ1), the steering angle θh (dashed line) is learned as the first candidate θm1 (dashed-dotted line). During the additional turning of the steering wheel, the first candidate θm1 (dashed-dotted line) increases to θ1.

In addition, an angle obtained by subtracting the second predetermined value from the steering angle θh is learned as the second candidate θm2 (dashed-two-dotted line).

Thus, while the first candidate θm1' the change rate of which is limited by the rate limiter 74 is greater than the second candidate θm2 (dashed-two-dotted line) (from time t1 to time t2), the first candidate θm1' is selected as the output θo (solid line) of the third storage unit 78, and, when, at time t2, the second candidate θm2 exceeds the first candidate θm1', the second candidate θm2 is selected as the output θo (solid line).

Subsequently, when, at time t3, the steering angle θh ceases to increase and stays at a constant value, the second candidate θm2 (dashed-two-dotted line) also ceases to increase. Thus, thereafter, the first candidate θm1' the change rate of which is limited by the rate limiter 74 is selected as the output θo (solid line) of the third storage unit 78.

Since, as described above, the first candidate θm1 (dashed-dotted line) increases to θ1, the output θo (solid line) of the third storage unit 78 also increases to θ1 later than the first candidate θm1. When, at time t4, the output θo (solid line) reaches θ1, the output θo ceases to increase.

When, subsequently, the steering angle θh starts to decrease and the reverse turning of the steering wheel is started, the steering angle θh decreases to θ2 at time t5. Then, the column output shaft torque Tc becomes less than or equal to the predetermined value T1. Thus, the angle θ2 is learned as the first candidate θm1 (dashed-dotted line).

Thus, the first candidate θm1' the change rate of which is limited by the rate limiter 74 starts to increase and is selected as the output θo (solid line) of the third storage unit 78. The output θo (solid line) increases until reaching θ2 at time t6 and subsequently becomes constant.

When comparing the output θo (solid line) of the third storage unit 78 that is learned as described above, that is, one of the virtual rack end positions θevr and θevl before being limited by the limiter 79, with a case where an angle obtained by simply subtracting the second predetermined value (for example, a maximum error estimation value) from the steering angle θh is learned (dashed-two-dotted line), the output θo of the third storage unit 78 can be learned as a steering angle positioned farther from the steering angle neutral point than the other. Thus, a steering angle positioned closer to an actual rack end position can be learned as one of the virtual rack end positions θevr and θevl.

Next, operation in the case where offset error occurs between the rack neutral position and the steering angle neutral position will be described. FIGS. 8A, 8B, and 8C are a conceptual diagram of actual rack end positions, a conceptual diagram of the virtual rack end positions θevr and θevl in the case where there is no offset error, and a conceptual diagram of the virtual rack end positions θevr and θevl in the case where there is an offset error, respectively.

In FIGS. 8B and 8C, the positions of "0 [deg]" indicate the steering angle neutral position. The same applies to FIGS. 8D to 8G. The steering angle neutral position in FIG. 8B coincides with the rack neutral position (the center position between the actual rack end positions), and the steering angle neutral position in FIG. 8C is shifted rightward from the rack neutral position by Δθ. That is, when the steering wheel is steered leftward further than the steering angle neutral position by Δθ, the rack 5b is positioned at the rack neutral position.

When offset error occurs, the impact mitigation control cannot be normally performed. In the example in FIG. 8C, since the right virtual rack end position θevr is positioned on the outer side of the actual rack end position, necessary reduction in impact and abnormal noise cannot be performed.

Thus, the terminal position learning unit 46, as described above, estimates an offset error Ofs between the rack neutral position and the steering angle neutral position and outputs the corrected steering angle θh1, to which the steering angle θh detected by the steering angle sensor 14 is corrected by subtracting the offset error Ofs from the steering angle θh.

FIG. 6 is now referred to. The stroke calculation unit 80 calculates distance between the right virtual rack end position θevr and the left virtual rack end position θevl as rack stroke St.

The offset error calculation unit 81 compares the rack stroke St with a predetermined rack stroke maximum value.

As the rack stroke maximum value, a maximum value that can be calculated as the rack stroke St may be set in consideration of error (variation) that the left and right virtual rack end positions θevl and θevr may have and the like.

When the rack stroke St exceeds the rack stroke maximum value, the offset error calculation unit 81 determines that offset error has occurred. The offset error calculation unit 81 calculates a difference obtained by subtracting the rack stroke maximum value from the rack stroke St as the offset error Ofs (=rack stroke St−rack stroke maximum value).

FIG. 8D is a conceptual diagram of a state in which, after offset error has occurred, the left virtual rack end position θevl is learned.

Since the steering angle neutral position is shifted to the right side of the rack neutral position, when the left virtual rack end position θevl is newly learned, the rack stroke St between the virtual rack end positions θevr and θevl exceeds the rack stroke maximum value. The offset error calculation unit 81 calculates a difference obtained by subtracting the rack stroke maximum value from the rack stroke St (rack stroke St−rack stroke maximum value) as the offset error Ofs.

In the following description, a virtual rack end position that is one of the right and left virtual rack end positions that is learned when a rack stroke St exceeding the rack stroke maximum value is calculated is sometimes referred to as "one virtual rack end position". In addition, a virtual rack end position that is one of the right and left virtual rack end positions that is not the one virtual rack end position is sometimes referred to as "the other virtual rack end position".

When, as in the example in FIG. 8C, the steering angle neutral position is shifted to the right side from the rack neutral position, the left virtual rack end position serves as one virtual rack end position and the right virtual rack end position serves as the other virtual rack end position. Conversely, when the steering angle neutral position is shifted to the left side from the rack neutral position, the right virtual rack end position serves as one virtual rack end position and the left virtual rack end position serves as the other virtual rack end position.

FIG. 6 is now referred to. The subtracter 82 calculates the corrected steering angle θh1 by subtracting the offset error Ofs calculated by the offset error calculation unit 81 from the steering angle θh detected by the steering angle sensor 14.

The terminal position correction unit 83 corrects the first candidate θm1 that the first storage unit 72 stores, the second candidate θm2 that the second storage unit 76 stores, the steering angle θo that the third storage unit 78 stores according to the offset error Ofs. With reference to FIG. 8E, the correction processing of the candidates and the steering angle will be described.

The subtracter 82 subtracting the offset error Ofs from the steering angle θh causes the steering angle neutral position (position at "0 [deg]") to move, as illustrated in FIG. 8E.

On the other hand, since the left virtual rack end position θevl (that is, one virtual rack end position) that was learned in FIG. 8D is a learned value before the steering angle neutral position, which serves as the base point, moves, when the steering angle neutral position is moved as illustrated in FIG. 8E, it is necessary to correct the left virtual rack end position θevl in association with this movement.

The terminal position correction unit 83 corrects the first candidate θm1 of the left virtual rack end position stored in the first storage unit 72 with the offset error Ofs. Since the left virtual rack end position is a negative value, the terminal position correction unit 83 corrects the left virtual rack end position by adding the offset error Ofs. The terminal position correction unit 83 also likewise corrects the second candidate θm2 and the steering angle θo that are stored in the second storage unit 76 and the third storage unit 78, respectively.

When the one virtual rack end position is the right virtual rack end position (that is, when the virtual rack end position is a positive value), the terminal position correction unit 83 corrects the right virtual rack end position by subtracting the offset error Ofs.

In addition, the terminal position correction unit 83 corrects (resets) the other virtual rack end position (in the example in FIG. 8E, the right virtual rack end position θevr) in such a way that the rack stroke St between the virtual rack end positions θevr and θevl coincides with a predetermined rack stroke minimum value. The rack stroke minimum value may be set to, for example, a minimum value within the variation of a value that can be calculated as the rack stroke St. This configuration can correct the other virtual rack end position to a position on the inner side of the actual rack end position.

FIG. 8F is now referred to. When a new left virtual rack end position θevl is further learned, the offset error calculation unit 81 calculates a change amount Δθevl of the virtual rack end position θevl between before and after update.

The offset error calculation unit 81, by adding the change amount Δθevl to the offset error Ofs before the new left virtual rack end position θevl is learned, updates the offset error Ofs. This update causes the steering angle neutral position to further move by the change amount Δθevl.

The terminal position correction unit 83 corrects the first candidate θm1 of the one virtual rack end position (the left virtual rack end position) that is stored in the first storage unit 72 with the change amount Δθev1. Since the left virtual rack end position is a negative value, the terminal position correction unit 83 corrects the first candidate θm1 by adding the change amount Δθev1. The terminal position correction unit 83 also likewise corrects the second candidate θm2 and the steering angle θo that are stored in the second storage unit 76 and the third storage unit 78, respectively.

When the one virtual rack end position is the right virtual rack end position (that is, the virtual rack end position is a positive value), the terminal position correction unit 83 corrects the first candidate θm1 by subtracting the change amount Δθev1.

In addition, the terminal position correction unit 83 corrects (resets) the other virtual rack end position (in the example in FIG. 8F, the right virtual rack end position θevr) in such a way that the rack stroke St between the virtual rack end positions θevr and θevl coincides with the predetermined rack stroke minimum value.

FIG. 8G is now referred to. When, after, as described in FIGS. 8E and 8F, the right virtual rack end position θevr (that is, the other virtual rack end position) was corrected (reset) in such a way that the rack stroke St coincided with the predetermined rack stroke minimum value, a new right virtual rack end position θevr is learned as in FIG. 8G, the offset error calculation unit 81 does not update the offset error Ofs. That is, the steering angle neutral position is not moved.

In addition, the terminal position correction unit 83 also does not correct the first candidate θm1 that the first storage unit 72 stores, the second candidate θm2 that the second storage unit 76 stores, and the steering angle θo that the third storage unit 78 stores.

Because of this configuration, only the right virtual rack end position θevr is adjusted in such a manner as to move away from the steering angle neutral position.

In addition, after the right virtual rack end position θevr (that is, the other virtual rack end position) is newly learned, the terminal position correction unit 83 stops correcting (resetting) the right virtual rack end position θevr in such a way that the rack stroke St coincides with the predetermined rack stroke minimum value.

From this point onward, even when a new left virtual rack end position θevl (that is, one virtual rack end position) is further learned, the terminal position correction unit 83, without correcting (resetting) the right virtual rack end position θevr in such a way that the rack stroke St coincides with the predetermined rack stroke minimum value, updates the offset error Ofs (that is, modifies the steering angle neutral position) as with FIG. 8F, and corrects the left virtual rack end position. On this occasion, the right virtual rack end position θevr is corrected by adding the offset error Ofs to the virtual rack end position θevr.

In addition, when a new right virtual rack end position θevr (that is, the other virtual rack end position) is further learned, the steering angle neutral position and the left virtual rack end position θevl (that is, one virtual rack end position) do not change and only the right virtual rack end position θevr changes.

(Variations)

The selection unit 71 of the terminal position learning unit 46 selects, depending on values of the column output shaft torque Tc and the steering torque Th, one of the corrected steering angle θh1 and the output of the delay unit 73 and outputs the selected one to the first storage unit 72. In this configuration, a value obtained by correcting the corrected steering angle θh1 with the amount of deformation of a mechanical part caused by the column output shaft torque Tc may be input to the selection unit 71. The selection unit 71 may select, depending on values of the column output shaft torque Tc and the steering torque Th, one of the corrected steering angle θh1 corrected with the amount of deformation and the output of the delay unit 73 and output the selected one to the first storage unit 72. The configuration as described above enables influence of torsion of the turning mechanism to be further reduced. The amount of deformation can be calculated from the column output shaft torque Tc and rigidity (spring constant) of the mechanical part. The rigidity is a ratio of a change amount of the column output shaft torque Tc to a change amount of the steering angle θh at a point indicated by the reference sign θ1 or θ2 in FIG. 7 and may be acquired through an experiment or the like.

Characteristics illustrated in FIG. 7 changes due to viscous resistance, which depends on steering velocity. There is a possibility that the steering velocity influences a learned value of a rack end. It may be configured such that a change amount of the learned value of the rack end with respect to a change amount of the steering velocity is acquired through an experiment or the like and stored as steering velocity correction amount characteristics and the steering angle θh is corrected based on the steering velocity and the steering velocity correction amount characteristics.

Whether or not the corrected steering angle θh1 is in the vicinity of one of the virtual rack end positions θevr and θevl is determined by comparison between one of the threshold values θthR and θthL, which are set closer to the rack center than the virtual rack end positions by the predetermined value Δθ, and the corrected steering angle θh1. There is a case where, after learning of the virtual rack end positions θevr and θevl, a change (error) occurs in the reference point of the steering angle θh detected by the steering angle sensor 14. This change occurs, for example, when a straight traveling state is detected and the reference point of the steering angle θh is calibrated. When such a change (error) occurs, there is a possibility that impact mitigation control output does not have desired characteristics.

Therefore, using a predetermined value Δθ1 obtained by adding a value Δm determined in consideration of a change (error) in the reference point of the steering angle θh to the predetermined value Δθ, a threshold value θthR=θevr−Δθ1 and a threshold value θthL=θevl+Δθ1 may be set. The value Δm is an example of a "fourth predetermined value" described in the claims. The threshold values θthR and θthL are located at positions set closer to the rack center than the virtual rack end positions by the predetermined value Δθ1. When configured in such a manner, even when a change (error) occurs in the reference point of the steering angle θh, the impact mitigation control output has desired characteristics.

Although an embodiment in which the turning control device of the present invention is applied to the electric power steering device is described above, the turning control device of the present invention is widely applicable to a variety of turning control devices other than the electric power steering device as long as the turning control device is a turning control device that generates force to turn the steered wheels of a vehicle by an actuator. For example, the turning control device of the present invention may be applied to a steering device of a steer-by-wire (SBW) type in which the steering wheel and the steered wheels are mechanically separated from each other. In this case, the steering torque Th does not have to be added to the motor torque when the column output shaft torque Tc is calculated.

Advantageous Effects of Embodiment (1) The turning control device includes a position detection unit configured to detect a steered position of the turning mechanism of a vehicle and the terminal position learning unit 46 configured to learn the terminal positions of the turning mechanism, based on the steered position detected by the position detection unit. The terminal position learning unit 46 includes the first storage unit 72 configured to store a steered position that is positioned farthest from the neutral position of the turning mechanism within the range of a steered position that the position detection unit detects when the rotational force applied to the turning mechanism is less than or equal to the first predetermined value, the second storage unit 76 configured to store a steered position that is positioned farthest from the neutral position within the range of a position to which the steered position detected by the position detection unit is shifted in the direction toward the neutral position of the turning mechanism by the second predetermined value, and the third storage unit 78 configured to store, as the terminal position that the terminal position learning unit 46 stores, one of the steered positions stored in the first storage unit 72 and the second storage unit 76 that is farther from the neutral position than the other.

This configuration enables virtual rack end positions that are less influenced by torsion of the steering mechanism due to rotational force applied to the turning mechanism to be learned. Because of this configuration, it is possible to reduce error between the virtual rack end positions and the actual rack end positions.

The steered position that the position detection unit detects when the rotational force applied to the turning mechanism is less than or equal to the first predetermined value may be corrected by a correction amount depending on the rotational force (first correction amount). In addition, the steered position may be corrected by a correction amount depending on the steering velocity (second correction amount). At least one correction amount from among the first correction amount and the second correction amount may be used. This configuration enables virtual rack end positions in which influence of torsion of the steering mechanism due to the rotational force applied to the turning mechanism and the steering velocity is further reduced to be learned.

(2) The terminal position learning unit 46 may include a stroke calculation unit 80 configured to, when the position detection unit detects a steered position that is positioned farther from the neutral position than one terminal position of the right and left terminal positions of the turning mechanism stored in the third storage unit 78, calculate the rack stroke St of the turning mechanism, based on the steered position detected by the position detection unit and the other terminal position of the right and left terminal positions stored in the third storage unit 78, a steered position correction unit 82 configured to, when the rack stroke St calculated by the stroke calculation unit 80 exceeds a threshold value, correct the steered position detected by the position detection unit, based on an excess amount by which the rack stroke St exceeds the threshold value, and a terminal position correction unit 83 configured to, when the rack stroke St calculated by the stroke calculation unit 80 exceeds a threshold value, correct the other terminal position stored in the first storage unit 72, the second storage unit 76, and the third storage unit 78 in such a way that one terminal position and the other terminal position are separated from each other by a predetermined distance.

Because of this configuration, it is possible to absorb offset error even when there occurs offset error between the rack neutral position and the steering angle neutral position and, after having learned the virtual rack end positions, achieve impact mitigation control that is appropriate for conditions of the vehicle.

(3) When rotational force applied to the turning mechanism is less than or equal to the first predetermined value and operational force acting on the steering operation unit of the vehicle is less than or equal to a third predetermined value, the terminal position learning unit 46 may store a steered position that is positioned farthest from the neutral position of the turning mechanism within the range of a steered position detected by the position detection unit in the first storage unit 72.

This configuration enables virtual rack end positions that are less influenced by torsion of the turning mechanism due to the rotational force applied to the turning mechanism and operational force acting on the steering operation unit to be learned.

(4) The terminal position learning unit 46 may calculate rotational force applied to the turning mechanism, based on a current command value for the motor 20 that drives the turning mechanism or current flowing to the motor 20.

Alternatively, the terminal position learning unit 46 may calculate rotational force applied to the turning mechanism, based on the sum of rotational torque calculated based on a current command value for the motor 20 that drives the turning mechanism or current flowing to the motor 20 and operational force acting on the steering operation unit.

The terminal position learning unit 46 may add inertia torque calculated from angular acceleration and a moment of inertia of the turning mechanism to the above-described rotational force.

This configuration enables virtual rack end positions to be learned according to rotational force applied to the turning mechanism.

REFERENCE SIGNS LIST

1 Steering wheel
2i Column input shaft
2o Column output shaft
3 Reduction gear
4 Intermediate shaft
4a, 4b Universal joint
4c Shaft member
5 Pinion rack mechanism
5a Pinion
5b Rack 6a, 6b Tie rod
7a, 7b Hub unit
8L, 8R Steered wheel
10 Torque sensor
11 Ignition key
12 Vehicle speed sensor
13 Battery
14 Steering angle sensor
20 Motor
30 Controller
40 Basic command value calculation unit
41, 42, 82 Subtracter
43 Current control unit
44 PWM control unit
45 Inverter
46 Terminal position learning unit
47 Control rotational displacement setting unit
48 Differentiating unit
49 Impact mitigation control unit
50 Current detector
60 Spring constant table
61, 63 Multiplier
62 Viscosity constant table
64 Adder
65, 79 Limiter
70 Output shaft torque calculation unit
71 Selection unit
72 First storage unit
73, 77 Delay unit
74 Rate limiter
75 Corrected position calculation unit
76 Second storage unit
78 Third storage unit
80 Stroke calculation unit
81 Offset error calculation unit
83 Terminal position correction unit

The invention claimed is:

1. A turning control device comprising:
a position detection unit configured to detect a steered position of a turning mechanism of a vehicle; and
a terminal position learning unit configured to learn a terminal position of the turning mechanism, based on the steered position detected by the position detection unit,
wherein the terminal position learning unit includes:
a first storage unit configured to store a steered position positioned farthest from a neutral position of the turning mechanism within a range of the steered position detected by the position detection unit when rotational force applied to the turning mechanism is less than or equal to a first predetermined value;
a second storage unit configured to store a steered position positioned farthest from the neutral position within a range of a position to which the steered position detected by the position detection unit is shifted in a direction toward the neutral position of the turning mechanism by a second predetermined value; and
a third storage unit configured to store one of steered positions stored in the first storage unit and the second storage unit, the one being positioned farther from the neutral position than the other, as the terminal position stored by the terminal position learning unit.

2. The turning control device according to claim 1, wherein
the terminal position learning unit includes:
a stroke calculation unit configured to, when the position detection unit detects the steered position positioned farther from the neutral position than one terminal position of right and left terminal positions of the turning mechanism stored in the third storage unit, calculate a stroke of the turning mechanism, based on the steered position detected by the position detection unit and the other terminal position of the right and left terminal positions stored in the third storage unit;
a steered position correction unit configured to, when the stroke calculated by the stroke calculation unit exceeds a threshold value, correct a steered position detected by the position detection unit, based on an excess amount by which the stroke exceeds the threshold value; and
a terminal position correction unit configured to, when the stroke calculated by the stroke calculation unit exceeds the threshold value, correct the other terminal position stored in the first storage unit, the second storage unit, and the third storage unit in such a way that the one terminal position and the other terminal position are separated from each other by a predetermined distance.

3. The turning control device according to claim 1, wherein the terminal position learning unit stores a steered position positioned farthest from a neutral position of the turning mechanism within a range of the steered position detected by the position detection unit when the rotational force is less than or equal to the first predetermined value and operational force acting on a steering operation unit of the vehicle is less than or equal to a third predetermined value, in the first storage unit.

4. The turning control device according to claim 1, wherein the terminal position learning unit calculates the rotational force, based on a current command value for an actuator driving the turning mechanism or current flowing to the actuator.

5. The turning control device according to claim 1, wherein the terminal position learning unit calculates the rotational force, based on a sum of rotational torque calculated based on a current command value for an actuator driving the turning mechanism or current flowing to the actuator and operational force acting on a steering operation unit of the vehicle.

6. The turning control device according to claim 4, wherein the terminal position learning unit adds inertia torque calculated from angular acceleration and a moment of inertia of the turning mechanism to the rotational force.

7. The turning control device according to claim 1, wherein the terminal position learning unit, by correcting the steered position detected by the position detection unit when the rotational force is less than or equal to the first predetermined value by at least one correction amount of a first correction amount depending on the rotational force and a second correction amount depending on steering velocity, calculates a corrected steered position and stores a steered position positioned farthest from a neutral position of the turning mechanism within a range of the corrected steered position in the first storage unit.

8. The turning control device according to claim 3, wherein the terminal position learning unit, by correcting the steered position detected by the position detection unit when the rotational force is less than or equal to the first predetermined value and operational force acting on a steering operation unit of the vehicle is less than or equal to the third predetermined value by at least one correction amount of a first correction amount depending on the rotational force and a second correction amount depending on steering velocity, calculates a corrected steered position and stores a steered position positioned farthest from a neutral position of the turning mechanism within a range of the corrected steered position in the first storage unit.

9. The turning control device according to claim 1 comprising:
- a command value calculation unit configured to calculate, based on an operation acting on a steering operation unit of a vehicle, a current command value for an actuator providing the turning mechanism with steering assist force;
- a command value correction unit configured to, when a steered position detected by the position detection unit is in a vicinity of the terminal position learned by the terminal position learning unit, correct the current command value calculated by the command value calculation unit; and
- a driving unit configured to drive-control the actuator, based on the current command value corrected by the command value correction unit.

10. The turning control device according to claim 9 comprising
- a command value correction unit configured to, when a position to which the terminal position is moved in a direction toward a neutral position of the turning mechanism by a fourth predetermined value is set as a temporary terminal position and the steered position is in a vicinity of the temporary terminal position, correct the current command value calculated by the command value calculation unit.

11. A turning device comprising:
the turning control device according to claim 9; and
an actuator configured to, drive-controlled by the turning control device, turn steered wheels of the vehicle.

* * * * *